(12) United States Patent
Trachte (10) Patent No.: US 8,243,039 B2
(45) Date of Patent: Aug. 14, 2012

(54) STEERING WHEEL INPUT/INTERACTIVE SURFACE

(76) Inventor: Ralf Trachte, Aarau (CH)

( * ) Notice: Subject to any disclaimer, the term of this patent is extended or adjusted under 35 U.S.C. 154(b) by 0 days.

(21) Appl. No.: 13/020,833

(22) Filed: Feb. 4, 2011

(65) Prior Publication Data

US 2011/0130924 A1    Jun. 2, 2011

Related U.S. Application Data (60) Division of application No. 11/541,500, filed on Sep. 29, 2006, now Pat. No. 7,898,530, which is a continuation of application No. PCT/EP2005/003338, filed on Mar. 30, 2005.

(30) Foreign Application Priority Data

Mar. 30, 2004    (DE) .......................... 10 2004 016 029

(51) Int. Cl.
*G09G 5/00* (2006.01)
(52) U.S. Cl. ........................................ 345/173; 345/156
(58) Field of Classification Search .......... 345/173–179, 345/168, 169; 178/18.01–18.11
See application file for complete search history.

(56) References Cited

U.S. PATENT DOCUMENTS

| | | | |
|---|---|---|---|
| 4,042,777 A | 8/1977 | Bequaert et al. | |
| 4,620,062 A | 10/1986 | Mizzi et al. | |
| 5,790,104 A | 8/1998 | Shieh | |
| 5,962,967 A | 10/1999 | Kiryuschev et al. | |
| 5,963,671 A | 10/1999 | Comerford et al. | |
| 6,210,771 B1 | 4/2001 | Post et al. | |
| 6,369,804 B1 | 4/2002 | Sandbach | |
| 6,585,435 B2 * | 7/2003 | Fang | 345/168 |
| 6,788,295 B1 * | 9/2004 | Inkster | 345/175 |
| 6,861,961 B2 * | 3/2005 | Sandbach et al. | 345/173 |
| 2002/0025837 A1 | 2/2002 | Levy | |
| 2002/0068605 A1 | 6/2002 | Stanley | |
| 2003/0181116 A1 | 9/2003 | Van Heerden et al. | |
| 2004/0066374 A1 * | 4/2004 | Holloway et al. | 345/168 |
| 2005/0024344 A1 | 2/2005 | Trachte | |
| 2005/0052428 A1 | 3/2005 | Hayashi et al. | |

FOREIGN PATENT DOCUMENTS

| | | |
|---|---|---|
| DE | 37 02 377 A1 | 8/1988 |
| DE | 203 11 135 U1 | 12/2003 |
| WO | WO 02/45538 A2 | 6/2002 |
| WO | WO 03/094719 A1 | 11/2003 |

OTHER PUBLICATIONS

IBM Technical Disclosure Bulletin; Soft Adaptive Follow-Finger Keyboard for Touch-Screen Pads; Nov. 1993; pp. 5-7.
Research Disclosure; Adaptive keyboard system for text entry on touch screens; Jan. 2000; 3 pages.

* cited by examiner

*Primary Examiner* — Regina Liang
(74) *Attorney, Agent, or Firm* — Harness, Dickey & Pierce, P.L.C.

(57) ABSTRACT

The steering wheel input is a flexible, interactive input, based on a touch-sensitive surface. Groups of functions are available from many positions of hands and fingers, gripping and controlling the steering wheel. For example travel directions indicators, headlight flashing/dipping and windscreen wipers can be controlled without having to raise the hand from the steering wheel. The keypad of a mobile telephone can also be simulated. PDA inputs can be carried out. A computer keyboard can be simulated Continuous encompassment of the hands is corrected by computer. The touch areas are continuously and dynamically adapted in the relationship thereof with respect to the balls of the hands or the thumb and fingers. This concept produces ergonomically appropriate and dynamically updated touch areas.

10 Claims, 5 Drawing Sheets

STEERING WHEEL INPUT/INTERACTIVE SURFACE

CROSS-REFERENCE TO RELATED APPLICATIONS

The present application is a divisional of U.S. application Ser. No. 11/541,500, filed Sep. 29, 2006, which is a continuation of International Patent Application PCT/EP2005/003338 filed on Mar. 30, 2005 and published in German language, which International Patent Application claims priority under the Paris Convention from German Patent Application DE 10 2004 016 029.5, filed Mar. 30, 2004. The entire contents of these priority applications are incorporated herein by reference.

Figure 1:
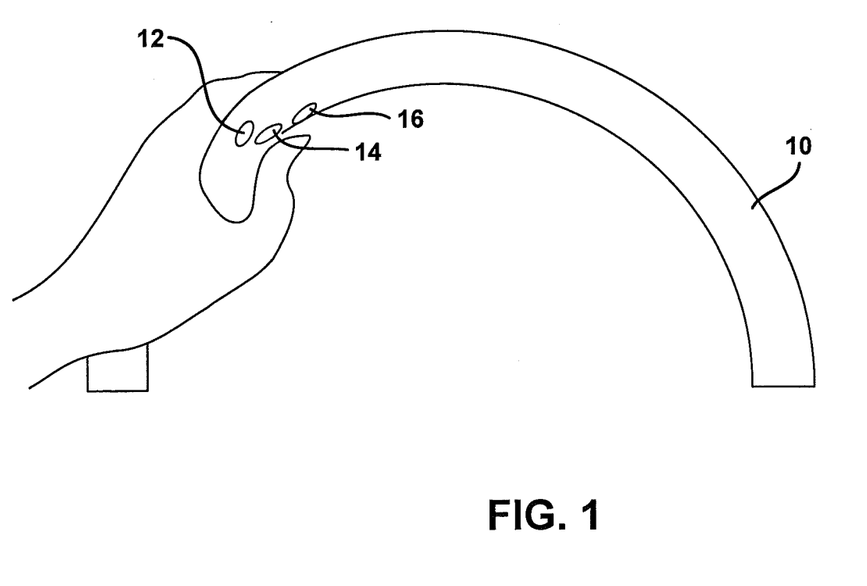
FIG. 1 is a diagrammatical view of a first portion of the steering wheel of a vehicle adapted for use as a computer input device having a first array of touch-sensitive surface areas according to the present invention.

Touch-sensitive surfaces can be used for making computer inputs with flexible adaptation to the hands. In this field there are innovative opportunities which have been unutilized until now. In particular, for the application on the steering wheel of a vehicle it is appropriate to use versions of the dynamic inputs which are related continuously to the instantaneous positions of the hands. The switching functions, for example travel direction indicators, dipping of headlights, wiping, which are the most important in particular for the hands are made available at the steering wheel—cf. FIG. 1 and FIG. 2. The surface of the steering wheel can therefore be used for controlling specific functions which relate to the vehicle, but it can also be used for controlling the telephone or PDA and finally also for controlling a personal computer by simulating a keyboard which is continuously dynamically adapted to the hands—cf. FIG. 3—only when the vehicle is stationary for the sake of safety. For the latter application cases, positions of the instantaneous touch zones can be displayed visually. And it is possible for the through connection of a finger to be perceived in a sensitive fashion as a nonlinear profile of force and travel. Here, variants of the design of such sensitive surfaces are explained. In particular, touch-sensitive surfaces can be implemented elastically by means of specific fabric-fiber structures which provide a nonlinear through-connection behavior which can be perceived sensitively. Corresponding structural solutions are mentioned. It is also possible to integrate visual display properties, in particular by means of light-emitting fibers or by means of a layer of light-emitting polymers or "electronic ink". Such structures can finally also be used for separate, mobile computer input devices—cf. FIG. 3 again.

DETAILED DESCRIPTION OF THE PREFERRED EMBODIMENTS

As shown in the accompanying drawings, the positions of the areas of the hand and fingers which are to be applied to the device are interrogated in order to generate a basic topography of the maximum ten fingers by means of which in turn an assignment topography is calculated for the relevant input face zones. As a result, pressure triggering processes give rise to respective control signals or alphanumeric signals. This assignment topography can comprise different signals for bent, relaxed or extended fingers. It is also still possible to determine the identity of areas of the hand and of fingers, for example by means of a pattern detection system, when the hands are moved or the gripping position changed. A plurality of small input face zones is continuously interrogated electronically and analyzed by means of a pattern detection method in order to update the basic topography and assignment topography. The input zone, in particular the steering wheel surface, is therefore composed of a plurality of small input face zones in a specific resolution. The assignment between an instantaneously activated input face zone and the control signal or alphanumeric signal which is triggered with it follows the continuously updated assignment topography. This is calculated from the available basic topography according to a pattern detection system and from the actually touched locations in relation to the previous assignment topography. That is to say the actually touched input face zones within the grid of the assignment topography firstly trigger a signal and secondly correct the position of the respective input face zone in the assignment topography by averaging within an adjustable empirical time period or within an adjustable number of actual activation processes. It is possible for continuously corrected characteristic values to be included in this calculation. That is to say the assignment topography is adapted individually and dynamically to the hands, habits and instantaneous movement and change in gripping position.

Figure 3:
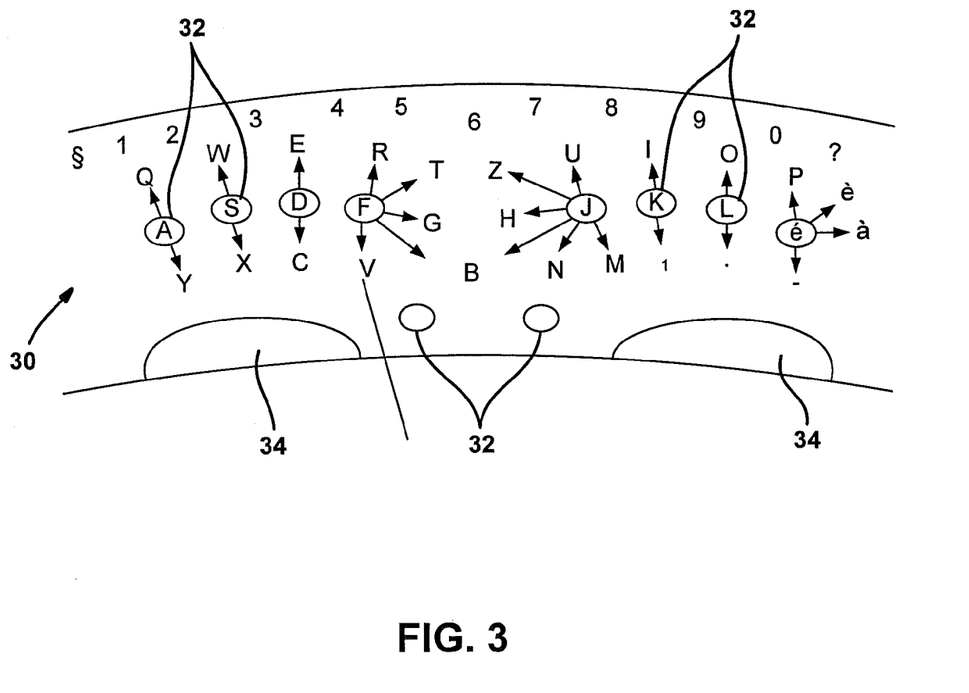
FIG. 3 is a diagrammatical view of a portion of the steering wheel of a vehicle having touch-sensitive zones for simulating an alphanumeric computer keyboard.

FIG. 3 shows, for example, the surface of the computer input device, here with touch zones of a simulated alphanumeric computer keyboard 30, that is to say with the instantaneous input face zones to which a respective alphanumeric character or a control character is assigned. This optional example of the instantaneous arrangement of the touch zones or of the input face zones shows, by means of ellipses, the instantaneous basic topography of the ten fingers 32 and the position of the hand rest surfaces 34. And the illustrated alphanumeric characters mark the instantaneous assignment topography which, if appropriate, can also be displayed by means of a display unit. This figure shows a view of the input face which is, for example, developed from the steering wheel.

In this concept which can be used in particular for the steering wheel, the areas of the hand positioned on the steering wheel, in particular the balls of the hand 34, also contribute to the process of determining the basic topography. The individual and dynamic adaptation of the assignment topography is in particular possible for an extensive computer keyboard (only when the vehicle is stationary for the sake of safety), for PDA keypads and for mobile phone keypads, for touch zones arranged in longitudinal rows and primarily for simple touch zones around an index finger and a thumb, which can also differentiate touch zones for bent fingers from those for extended fingers This concept can in particular be applied by means of a touch-sensitive surface which can integrate tactile feedback in the through-connection behavior in a sensitive fashion and can also integrate visual feedback—for use in a stationary vehicle—with display properties (see below). It is additionally possible to agree a double click in order to provide the possibility of differentiating desired triggering from unintentional contact.

This concept provides data input possibilities for moving hands. Inputs of the devices of the data communication and control activities which are related to the vehicle take place on a homogeneous or quasi-homogeneous surface which acts as a plurality of input faces. The differentiation between a change in the hands and fingers which is not intended to be a data input—for example when changing the gripping position on the steering wheel—and the intentional triggering of pressure by the hands which has been carried out in order to input data can either be recognized from the type of deviation of the positions and pressure-triggering processes with respect to the instantaneously applicable basic topography or should be characterized, for example, as a double click.

This concept provides in particular four applications:

1.) The input face simulates a computer keyboard. For example, a sensitive steering wheel surface can then be used as a computer keyboard, when the passenger car is stationary. For the purpose of initialization it is sufficient to position the ten fingers. The necessary deviations from the basic topography which are necessary to trigger signals can remain relatively small because this system can also operate in this way. This system which is capable of learning can also recognize very small distances, for example between normal and extended finger positions as sufficient. In this way a computer keyboard also fits onto the surface of a steering wheel.

2.) The input face simulates a PDA keypad or mobile phone keypad.
   A) For the purpose of initialization by means of, for example, two to five—or up to ten—fingers which have been positioned in a spread-out fashion, the extent of the standard mobile phone keypad is predefined. When two pressure locations are perceived it is possible, for example by means of the presetting of the system, to assume that the fingers are an index and a middle finger, from which the position of the other fingers follows. In this sense it is also possible to interpret three, four or five pressure locations per presetting in a self-evident fashion.
   B) Alternatively, for the purpose of initialization, that is to say for acquiring the basic topography, the steering wheel is held tight with one hand and, for example, two to five fingers of the other hand are spread out. The basic topography follows from this, and ultimately the assignment topography.

3.) The input face provides approximately ten input face zones which are arranged in longitudinal rows, i.e. touch zones which control, in particular, a PDA or a mobile phone. By means of, for example, two to five—or up to ten—fingers which are positioned in a spread-out fashion it is possible to predefine the extent of the touch zones for the purpose of initialization—see also item 2. The basic topography follows from this, and ultimately the assignment topography. A distinct distance in the centre separates the input face zones of the left and right hands.

Figure 2:
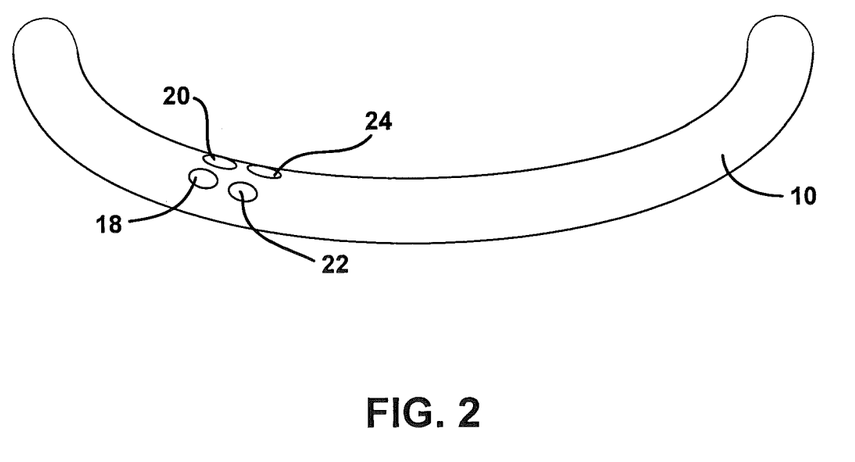
FIG. 2 is a diagrammatical view of a second portion of the steering wheel shown in FIG. 1 having a second array of touch-sensitive surface areas according to the present invention.

4.) The input face interprets, in particular, the touch zones around the index finger and thumb as controlling input face zones. In this way it is possible, for example, to control travel direction indicators, means for setting headlights to full beam and for dipping them and windshield wipers, without removing one's hand from the steering wheel. In order to perform initialization it is sufficient to grasp the steering wheel in the usual way. Continuous changes in the gripping position of the hands is corrected and adapted computationally. The detection of the control signal of a finger is relatively simple here because the basic topography can be continuously detected by means of the supported hand, that is to say in particular by means of the supported balls of the hands. The presettings may be, for example, as follows:
   A) For the control of the direction indicator display the following applies, for example, double click on the loosely extended left-hand index finger as a "left-turn" travel direction indicator and double click on the loosely extended right-hand index finger as a "right-turn" travel direction indicator. The occasionally necessary switching off of the travel direction indicator can then be carried out by a double click on a position approximately centrally between the two basic positions of the hands or can be cancelled by a further double click.
   B) For example the headlight can be set to full beam by a double click by the slightly bent left-hand index finger. The beam can be dipped by a double click by the left-hand thumb.
   C) For example the windshield wiper can be switched to a faster speed—from the intermittent setting to normal setting and to a fast setting—by double click by the slightly bent right-hand index finger. The windshield wiper can be switched to a slower speed by a double click by the right-hand thumb.
   D) Alternatively the most important control functions of the vehicle can be triggered with just one hand on the steering wheel. In order, for example, to have the right hand free for switching or other operations it is possible to activate the most important control functions with the left hand—cf. FIGS. 1 and 2. As diagrammatically shown in FIG. 1, the upper portion of the steering wheel 10 facing the driver may be provided at instantaneous touch zones for the left-hand thumb positioned towards the hand 12, in the relaxed position 14, and extended from the hand 16. Similarly, as shown in FIG. 2, the upper portion of the steering wheel 10 facing away from the driver may be provided with instantaneous touch zones for the middle finger of the left-hand in the non-extended 18 and extended 20 positions, and for the index finger of the left-hand in the non-extended 22 and extended 24 positions. The assignments for these touch zones can be set individually. For example, the double click by the loosely extended left-hand middle finger of the travel direction indicator can mean "turn left" and the double click on the loosely extended left-hand index finger as a travel direction indicator can mean "turn right". The dipped headlights and wipers can be activated, for example, by the left-hand thumb.
   E) The essential identification of the thumbs and index fingers follows from the currently available basic topography. Moreover, in this example it is only necessary to differentiate between slightly bent and loosely extended index finger. This differentiation can take the form of the individual and dynamic adaptation of the system, i.e. it can ultimately be "trained" and reduced by the "learning-enabled" system to a small and convenient difference. Hazardous control signals should not be possible here for safety reasons, i.e. for example it should not be possible for this system to switch off the headlights or to completely switch off the windshield wiper. (Both of these would then have to be done by customary switches on the dashboard). It is possible to agree, for example, a quadruple click by an index finger as a means of activating the entire system.

In order to differentiate between an unintentional movement as against intentional pressing in order to trigger a control signal it is possible, for example, for the double click to apply as a presetting which relates in particular in applications 2, 3 and 4. In the case of uses with frequent movement and relatively large changes in the gripping position of the hands, for example when steering a motor vehicle, the double click can therefore be agreed in order to actually trigger a corresponding control signal, for example setting the headlights to full beam.

On top of this, large movements of the areas of the hand, in particular of the balls of the hand, can be checked and recognized by a pattern detection system which determines the identity of the areas of the hands and fingers from the topology of large and small pressure areas and thus supplements the determination of the basic topography. Each change in gripping position requires renewed checking or, as it were, renewed initialization of the basic topography.

The sensitive steering wheel surfaces or input devices which can be continuously adapted for individual hands and instantaneous situations can be implemented, in particular, as fabric in a number of variants. It is possible to use and combine fabric types or layers which (a) react in an electrically effective fashion on contact, for example through a measurable change in resistance or capacitance, (b) provide sensitive, tactile feedback during a through connection and (c) fabrics or layers which provide visual feedback, for example fabrics with light-emitting fibers. These fabric types or layers are either placed one on top of the other or the aforesaid qualities are integrated into a complex fabric. The solutions specified here therefore (a) make the input face touch-sensitive or approach-sensitive to a plurality of fingers positioned simultaneously, (b) they provide a perceptible through-connection behavior and (c) they simultaneously make the instantaneously effective characters visually recognizable in their arrangement on the input area. They are thus in a certain competition with customary computer keyboards and with customary touch screens or interactive displays. The provision of both sensory input qualities and visual display qualities in one area is appropriate in order to adapt the interface in a continuously dynamic fashion to hands, handling habits and situations.

The important factor is therefore to make the input face zones which respectively apply to the characters at a particular time visible with an appropriate resolution. It is thus already sufficient to provide visual characterization of the assignment locations or of the various input face zones, for example through textile fibers which can be illuminated, in order to mark this instantaneous assignment topography. At best, the characters or control instructions can be displayed with fine resolution, for example by means of "electronic ink" or very fine textile fibers which can be illuminated or by organic LEDs. "Electronic ink" is currently being developed, for example, by Xerox and E-Ink. These computer input devices can therefore be coated with a layer of "electronic ink" or light-emitting polymer, in particular OLED, in order to visually display the instantaneous assignment between the input face zone and the respective character. This applies both to a steering wheel, which can also be used for example, as, a computer keyboard in a stationary vehicle, and to another computer input device.

The properties of such a device or of such a method therefore vary in the range between, on the one hand, a keyboard-like surface which does not provide any visual information, or only very simple visual information, and, on the other hand, a high quality visual touch screen. The solutions explained here can ideally also differentiate a plurality of fingers simultaneously. It can also be sufficient for just part of the visually displayed area—in particular the lower part—to represent the aforesaid instantaneous arrangement of the characters while the other—upper—part of the area serves only as a screen. Different variants which respectively make compromises between optical and tactile qualities, are conceivable.

In particular the following solutions with particular properties are suitable as a steering wheel cover and as a light-weight and transportable computer input device.

These fabrics can be implemented, inter alia, by laying certain types of fabrics one on top of the other: one type made of touch-sensitive fibers or lamellas which is effective electrically or through changes in electrical capacitance, if appropriate a separate fabric type of tactile feedback of the nonlinear through-connection behavior, and a further fabric type with display properties, which fabric type acts, in particular, by means of light-emitting fibers. These fabrics can be linked to one another at specific intervals in such a way that an appropriately precise assignment between touch-sensitive input face zones and visually recognizable display zones is brought about.

These fabrics can be implemented in particular by this input face being composed both of touch-sensitive fibers or lamellas which are effective electrically or electrostatically or through changes in electrical capacitance and of fibers with a light-emitting capability which are woven thereto. These light-emitting fibers act as visually recognizable display zones and indicate the instantaneous assignment between the input face zone and respective character visually.

Specifically shaped fibers or lamellas which have a specific flexural rigidity or torsional rigidity and which have a non-linear behavior in the proportion—which can be perceived by the fingers—of the application force to the spring travel can be woven into these touch-sensitive fabrics or into adjacent fabric layers: after a certain small spring travel, the further application force no longer increases but rather stays the same or decreases again. As a result, a through connection which can be clearly felt in a sensitive fashion is provided in the sense of a toggle lever effect.

Figure 4:
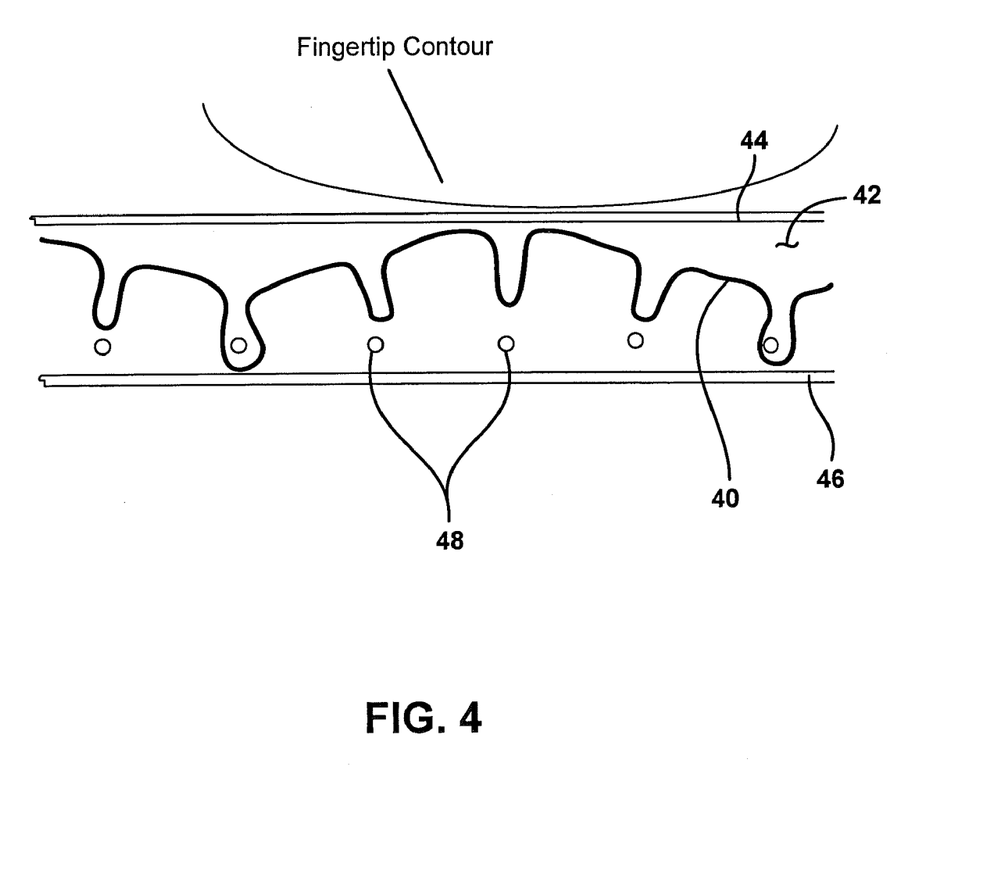
FIG. 4 is a cross-sectional view of a portion of the steering wheel shown in FIGS. 1-3.

This effect can be achieved in particular by weaving in elastic fibers or lamellas 40 with an appropriate pretension which form small arches which protrude slightly out of the surface of this fabric layer 42 and can be pressed in elastically by the pressure of a finger. This fabric layer can be supported on adjacent fixed fabric layers 44 and 46.

Within the fabric layers, "action=reaction" applies to the activation of such a point on this input face. That is to say the force applied by a finger is passed on through a plurality of fabric layers and the fabric with the aforesaid sensitive feedback can be introduced as any of the fabric layers. This position does not have to be identical to the fabric layer which produces the signal. It is thus perfectly possible for the functions of the tactile feedback and of the electrically effective deformation to be installed in separate layers.

One simple variant with, in particular, metallic fiber with a circular cross section which, as described below, is specially preformed, has to be supported laterally by the spatial fabric.

In contrast, in the "lamella arches" variant a lamella-like semifinished product is woven in. As described below and illustrated in FIG. 4, specially shaped ribbons or lamellas 40 are woven into one of the fabric layers. The lamella arches formed in this way are stable in the lateral direction owing to their cross-sectional profile, as a result of which their spring travel is directed predominantly perpendicularly to the input face. In each case an elastic lamella arch produces an input face zone which can be perceived in a tactile fashion. It is supported with a hinge-like, relatively tight curvature in each case at the bottom on one or more transversely extending fibers 48 in order to ensure that springing back occurs after activation. These transversely extending fibers 48 conduct the horizontal forces into a lower tensile-force-resistant layer.

These arches should be composed of fibers, lamellas or ribbon which are preformed in such a way that in each case a downward and an upward curvature and again a curvature in the initial direction occur along the surface at specific intervals, said curvatures forming slight arches during the fixing of every second, in particular every third or fourth or fifth of these curvature points in the fabric, and when pressure is exerted by a finger said arches experience downward spring compression like an overloaded bridge arch and are also compressed in a longitudinal direction without moving out laterally to an appreciable degree in order therefore to support, through their ratio of the height of these curvature points to the length of the material located between them and through the compressibility in the approximately horizontal direction, the spring compression of an arch with a toggle lever effect. This is therefore a type of extended zigzag form or else with more gentle radii a type of wave form. Cf. FIG. 4. For example, two arches with, for example, four of these zigzag sections each can be implemented per centimeter so that a fingertip continuously touches at least one of these microswitches. Basically, it is also possible to position two— or more—of these feedback fabric layers approximately offset one on top of the other in order to achieve finer resolution.

Between the bindings by means of the transverse fibers there are therefore a plurality—for example two, three or four—of the aforesaid curvature sections unattached and they permit the spring compression of this arch with a certain toggle lever effect: as the pressure on the arch increases it experiences a spring compression, and with further spring compression it loses its load bearing capacity—in the direction perpendicular to the input face—and can finally experience spring compression without a relatively large application force and can move down onto transversely extending fibers located below it.

Instead of the aforesaid continuous zigzag shape or wave shape, those curvature sections which are bound into the tensile-force-resistant fabric layer can also continuously already be made slightly higher in the preforming process that those located between them. As a result, such an arch experiences spring compression somewhat further when activation occurs and has a somewhat clearer toggle lever effect.

For example, the variant with two or four free curvature sections within an arch is satisfactorily compatible with the variant with three or five or seven fibers which extend transversely below it and lie one next to the other: this is because the spring compression of a lamella arch touches, with the centre between its curvature sections, in a downward direction the electrically conductive central transverse fiber, which is possibly to be measured, of the three or five or seven transverse fibers, which can produce a clear electrical measuring signal. Cf. FIG. 4. In the lower fabric area, the other fibers as it were support and fix the position of the fiber which is possibly to be measured under the centre of the arch. The advantage of this solution is that at first, without activation, there is a clear distance between the arch and the fiber to be measured, but then when activation occurs a touching or approaching process gives rise to large differences in measured values. Depending on the method, it is possible (a) for the change in resistance between noninsulated conductive fiber elements and arch elements to be measured or (b) for the change in capacitance between insulated fiber elements and arch elements to be measured.

The fiber arches or lamella arches can also be supported on one another laterally through a horizontal offset—"phase shifted" in the direction along the arch—in relation to the respective adjacent arch or lamella arch. The spring travel is thus guided predominantly in the perpendicular direction to the input face by this lateral support. And the tensile stresses can be absorbed within a (lower) tensile-force-resistant layer: in the longitudinal direction the fiber arches or lamella arches can be supported on one another by the forces which are tangential to the surface and which occur during pressure activation compensating one another.

Optionally, the fibers or lamellas with the aforesaid properties of feedback by a toggle lever effect can be woven in two directions—in particular orthogonal to one another—and thus additionally stabilize one another in their position. Small "vaults", which are respectively formed from intersecting fibers or lamellas and which can experience spring compression, are formed.

Within the entire structure, just one of the fabric layers can produce the sensitive feedback. For this purpose, this layer should be composed of a lower fabric area which gives it mechanical stability, in particular tensile strength, and it should be composed of an upper fabric area which is essentially composed of the electrically effective fibers or ribbon lamellas to be activated. The upper area has sprung sections by virtue of the fact that fibers or ribbon lamella arches are woven in small sections which are self-supporting in themselves. These two aforesaid fabric areas are woven tightly to one another. As an entire unit they form the fabric layer which produces a sensitively perceptible feedback for the fingers.

Figure 5:
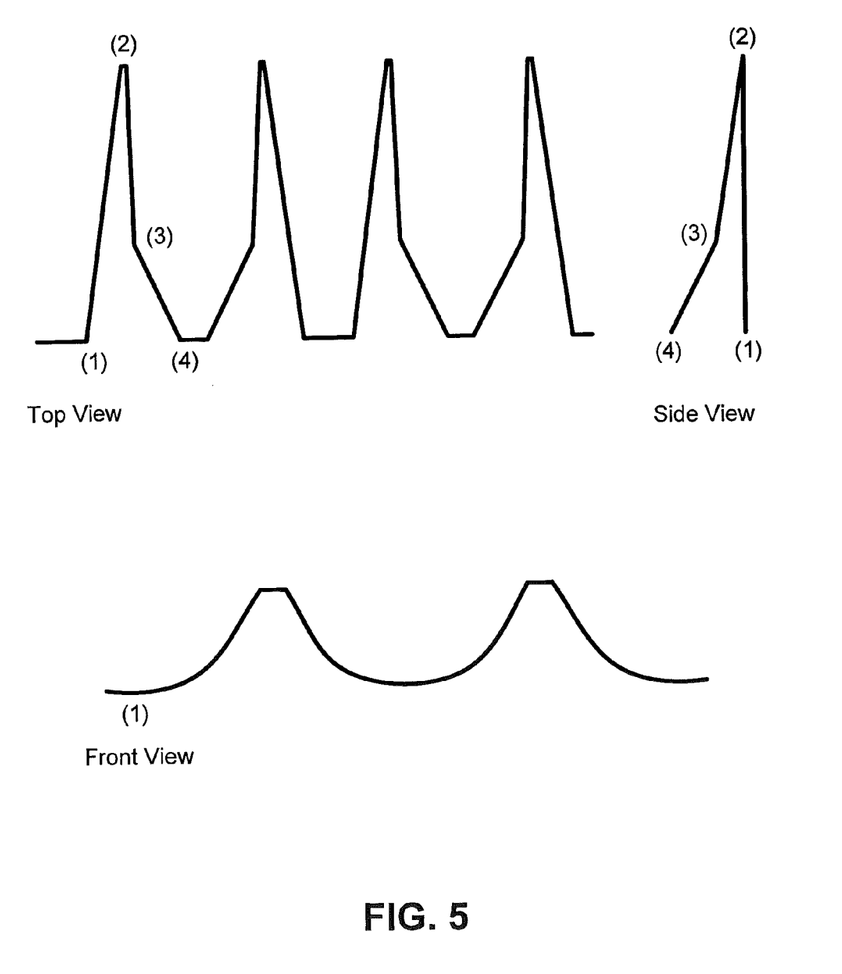
FIG. 5 comprises top, side and front views of elastic elements, such as pre-formed wires, integrated into one of the layers of material in the vehicle steering wheel.

The nonlinear through-connection behavior which can be perceived in a sensitive fashion can, for example, also be implemented by means of the following structure: variant "flexural torsion loops". Referring to FIG. 5, a spring wire is preformed in such a way that it repeatedly protrudes laterally through a tight curvature (1), returns with a tight curvature (2) after a certain distance, at the same time gaining some height, before, at a certain distance from the initial main line— horizontal axis according to FIG. 5—at a curvature point (3) it both gains height more steeply and points to the side in a somewhat more pronounced fashion until it reaches a wire section (4) with maximum height, which takes up the pressure exerted by fingers or areas of the hand. The wire section between the curvature point (3) and the highest area (4) has a gradient of, for example, approximately 30 to 45 degrees in a side view. And in the top view is inclined by, for example, approximately 45 degrees with respect to the main line— horizontal axis. This wire section results, owing to its leverage, in, in particular, a torsion load for the section (2) to (3) which, when activation occurs, even at first allows this leverage to increase still more so that the torsion loading increases superlinearly and promotes the further torsion. If the section (3) to (4) is approximately horizontal in the side view, the effect of rigidity of this design due to torsion is relatively low. This gives rise to the perceptibly gentle through-connection behavior.

The proportion of the rigidity of this design which is brought about by bending also has an area with gentle through connection: in a side view it becomes apparent that the points (1) and (4) approach one another by virtue of the fact that the wire sections lying between them are bent elastically. The proportion of the forces in the direction from point (1) to point (4) loses supporting capability considerably under spring compression and its vertically supporting component finally collapses and provides a toggle lever effect.

The relation between the components of the two effects can be selected structurally within certain limits by selecting the angles and dimensions. Thus, it would be possible, for example, to dispense with the nonlinear torsion effect by connecting the points (2) to (4) of the wire without curvature. Alternatively, the curvature could even be emphasized by integrating a joint additionally into the structure described above, in the region of the point (4).

Figure 6:
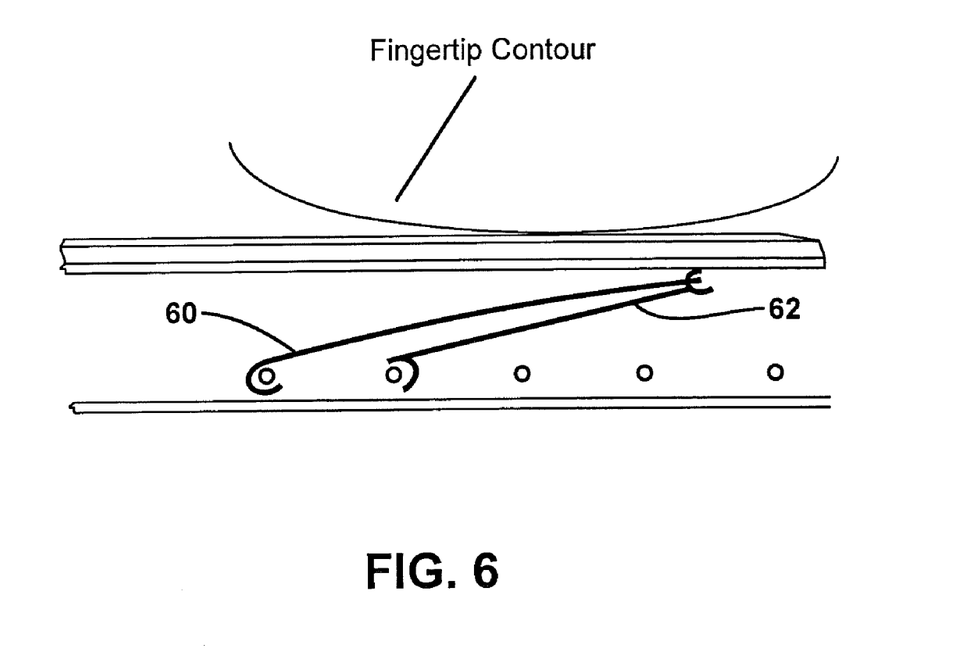
FIG. 6 is a cross-sectional view of a vehicle steering wheel illustrating an alternative manner of integrating elastic elements, such as pre-formed wires, into one of the layers of material in the steering wheel.
Figure 7:
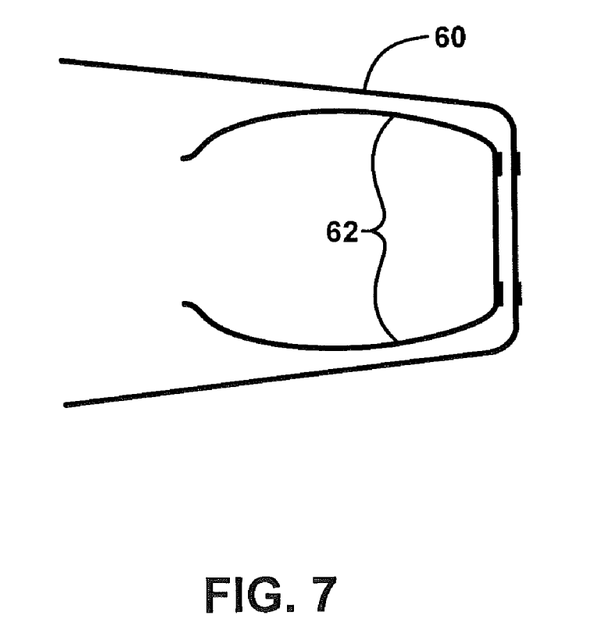
FIG. 7 is a top view of the integrated elastic elements, such as pre-formed wires, shown in FIG. 6.

A further variant of elastic elements is composed, in particular, of the preformed wire or lamella element—"cantilever" variant: elements which are frequently integrated into the input face cf. FIGS. 6 and 7—are constructed in such a way that part of a respectively acutely angled cantilever 60 is subjected to tensile loading and another part 62 of this cantilever is subjected to compressive loading. The latter produces flexural loading through lateral protrusion of this second part 62 so that when the cantilever is activated approximately perpendicularly with respect to the input face this protrusion bulges out further elastically and the lever thus loses its supporting capability as a result of leverage which becomes progressively more unfavorable, and finally yields at a minimum activation force. These elements provide a nonlinear through connection which can be perceived sensitively.

It is possible to roll up all these structures by leaving the fiber arches or lamella arches or the bending torsion loops on the outside and stretching them somewhat during the rolling up process.

The interweaving or knitting together of the aforesaid electrically effective fibers, lamellas or fabric layers on the one hand and the light-emitting fibers on the other is possible provided that electrically capacitively effective fibers can be insulated, because a sufficiently large change in, particularly, the electrical capacitance between the fibers is already produced as they approach and can be evaluated as a signal triggering means, but on the other hand the aforesaid visually active display fibers, in particular light-emitting polymer fibers, emit light at the actual contact points of intersecting fibers and are not to be insulated.

In the computer input devices proposed here it is possible for the visual display to give rise to interfering electrical or electromagnetic fields. However, they can be corrected again and eliminated by calculation during the evaluation of the input data of the touch-sensitive and approach-sensitive layer. These possibly interfering changes in fields are known in principle by virtue of the data to be displayed and can thus be corrected for the respective small input face zones.

The signals from this sensitive surface which are to be passed on to a computer unit can be continuously standardized in the unloaded position of rest as a "zero signal". The input device is therefore also to be used in arched layers. It is thus also possible to compensate possible gradual deformations of the fabric. In the case of the steering wheel, in particular holding it in a static fashion is to be interpreted as being position of rest which does not trigger any control signals. Accordingly, sensitive surfaces which are generally made of textiles can be standardized with various kinds of arching as a neutral output position.

The invention claimed is:

1. A computer input device comprising an input face having a plurality of touch-sensitive input face zones for making selected through connections to provide signals to a control unit coupled thereto, characterized n that the touch-sensitive input face zones of the device further comprise layers or fabric layers having fibers, wires, or lamellas integrated into a touch-sensitive layer or adjacent fabric layers, wherein the integrated fibers, wires or lamellas are configured to provide a non-linear response to the application of force by a user's fingers to the input face zones such that after a certain small depression thereof, further depression requires the application of force that stays the same or decreases to produce said through connection, thereby providing tactile feedback similar to a toggle-lever effect to the user of the activation of said through connection; and further wherein the integrated fibers, wires, or lamellas comprise ribbon-like material having a flat cross-section that are woven into one of the fabric layers with appropriate pretension to form small arches which protrude slightly out of the surface of the fabric layer and when pressed in elastically by the pressure of a finger spring downwardly to provide a through connection.

2. A computer input device comprising an input face having a plurality of touch-sensitive input face zones for making selected through connections to provide signals to a control unit coupled thereto, characterized in that the touch-sensitive input face zones of the device further comprise layers or fabric layers having fibers, wires, or lamellas integrated into a touch-sensitive layer or adjacent fabric layers, wherein the integrated fibers, wires or lamellas are configured to provide a non-linear response to the application of force by a user's fingers to the input face zones such that after a certain small depression thereof, further depression requires the application of force that stays the same or decreases to produce said through connection, thereby providing tactile feedback similar to a toggle-lever effect to the user of the activation of said through connection; and further wherein the integrated fibers, wires, or lamellas are preformed in such a way that a series of downward and upward curvature sections occur along the surface repeatedly at specific intervals so that during the weaving process slight arches are formed from groups of said curvature sections which, when pressure is applied by fingers, spring downwardly and also compress in the longitudinal direction, without moving out appreciably in the lateral direction.

3. A computer input device comprising an input face having a plurality of touch-sensitive input face zones for making selected through connections to provide signals to a control unit coupled thereto, characterized in that the touch-sensitive input face zones of the device further comprise layers or fabric layers having fibers, wires, or lamellas integrated into a touch-sensitive layer or adjacent fabric layers, wherein the integrated fibers, wires or lamellas are configured to provide a non-linear response to the application of force by a user's fingers to the input face zones such that after a certain small depression thereof, further depression requires the application of force that stays the same or decreases to produce said through connection, thereby providing tactile feedback similar to a toggle-lever effect to the user of the activation of said through connection; and further wherein one of the fabric layers is composed of a lower fabric zone which gives this fabric layer a mechanical stability in tensile strength, and an upper fabric zone comprising the integrated fibers, wires, or lamellas, and further wherein the lower and upper fabric zones are woven to one another.

4. A computer input device comprising an input face having a plurality of touch-sensitive input face zones for making selected through connections to provide signals to a control unit coupled thereto, characterized in that the touch-sensitive input face zones of the device further comprise layers or fabric layers having fibers, wires, or lamellas integrated into a touch-sensitive layer or adjacent fabric layers, wherein the integrated fibers, wires or lamellas are configured to provide a non-linear response to the application of force by a user's fingers to the input face zones such that after a certain small depression thereof, further depression requires the application of force that stays the same or decreases to produce said through connection, thereby providing tactile feedback similar to a toggle-lever effect to the user of the activation of said through connection; and further wherein the integrated fibers, wires, or lamellas are configured to form cantilever elements that are constructed in such a way that one cantilever element is acutely angled to another cantilever element-, wherein said one cantilever element is subjected to tensile loading and said another cantilever element is subjected to compressive loading to activate said through connection.

5. A computer input device comprising an input face having a plurality of touch-sensitive input face zones for making selected through connections to provide signals to a control unit coupled thereto, characterized in that the touch-sensitive input face zones of the device further comprise layers or fabric layers having fibers, wires, or lamellas integrated into a touch-sensitive layer or adjacent fabric layers, wherein the integrated fibers, wires or lamellas are configured to provide a non-linear response to the application of force by a user's fingers to the input face zones such that after a certain small depression thereof, further depression requires the application of force that stays the same or decreases to produce said through connection, thereby providing tactile feedback similar to a toggle-lever effect to the user of the activation of said through connection, wherein the device consists of a steering wheel or steering wheel element, and is further characterized in that the touching of the input face zones by areas of the hand, in particular by the balls of the hand and by fingers is recognized as being by areas of the hand and fingers and used to calculate the identity of the individual fingers and thus to calculate a temporarily valid basic topography for the areas of the hand and for the fingers with respect to the input face zones.

6. The computer input device of claim 5, characterized in that the determination of a basic topography for the hands of the user with respect to the input face zones takes place in an initialization phase on the basis of the positioned hands of the user and is then continuously adapted to current conditions in an operating phase which dynamically assigns a respective alphanumeric character or a control function to the input face zones.

7. The computer input device of claim 5, characterized in that the determination of the assignment topography which assigns alphanumeric characters or control functions to the input face zones is carried out in an initialization process according to a defined system which corresponds to one of a customary computer keyboard, a customary key assignment system for a mobile phone, or touch zones for up to ten fingers which are arranged in a longitudinal row or around the index finger and thumb, said zones carrying out simple switching and control functions.

8. The computer input device of claim 5, characterized in that a grouping of alphanumeric functions or control functions is available from a large number of basic positions of the areas of the hand and fingers with respect to the input face zones, the assignment of which functions to the specific input face zones is continuously and dynamically adapted to individual, instantaneous conditions.

9. The computer input device of claim 5, characterized in that at least two predetermined control functions can continuously be activated from a large number of positions of the areas of the hand and fingers with respect to the input face zones by means of the index finger, middle finger or thumb of the left hand or the right hand.

10. A computer input device comprising an input face having a plurality of touch-sensitive input face zones for making selected through connections to provide signals to a control unit coupled thereto, characterized in that the touch-sensitive input face zones of the device further comprise layers or fabric layers having fibers, wires, or lamellas integrated into a touch-sensitive layer or adjacent fabric layers, wherein the integrated fibers, wires or lamellas are configured to provide a non-linear response to the application of force by a user's fingers to the input face zones such that after a certain small depression thereof, further depression requires the application of force that stays the same or decreases to produce said through connection, thereby providing tactile feedback similar to a to e-lever effect to the user of the activation of said through connection; and wherein an instantaneously valid assignment of characters or control functions to the input face zones is displayed visually to the user.

* * * * *

UNITED STATES PATENT AND TRADEMARK OFFICE
CERTIFICATE OF CORRECTION

| | | |
|---|---|---|
| PATENT NO. | : 8,243,039 B2 | Page 1 of 1 |
| APPLICATION NO. | : 13/020833 | |
| DATED | : August 14, 2012 | |
| INVENTOR(S) | : Ralf Trachte | |

It is certified that error appears in the above-identified patent and that said Letters Patent is hereby corrected as shown below:

Column 12,
Line 42 (Claim 10), "to e-lever" should be -- toggle-lever --.

Signed and Sealed this
Sixth Day of November, 2012

David J. Kappos
*Director of the United States Patent and Trademark Office*